Jan. 23, 1968   L. R. ALEXANDER ET AL   3,365,332
FUEL CELL CONSTRUCTION
Filed Feb. 17, 1961
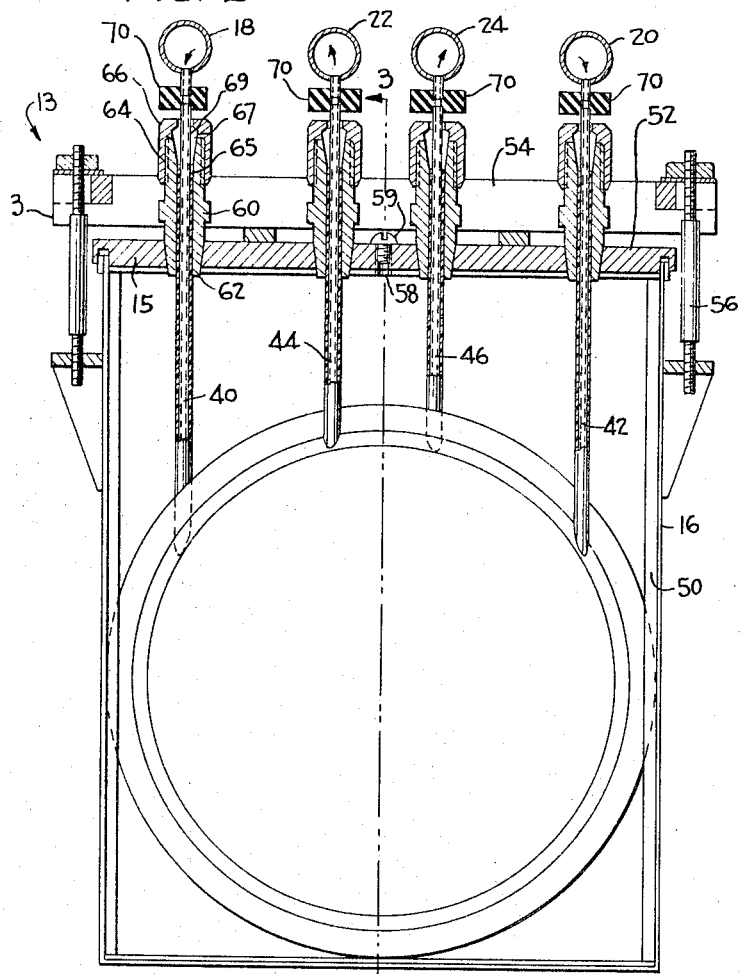
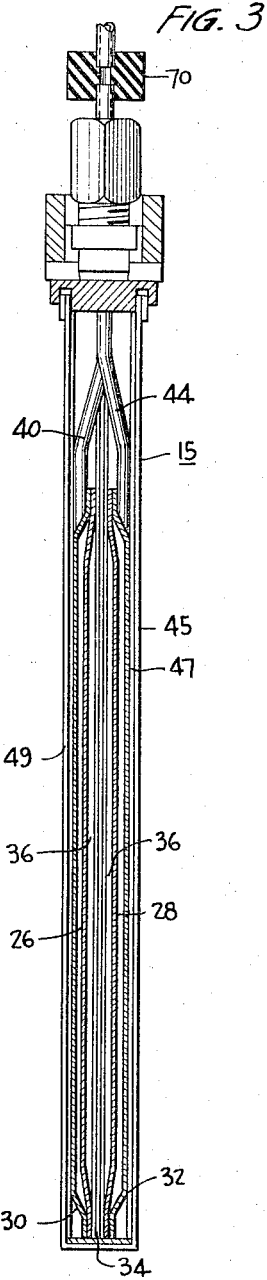
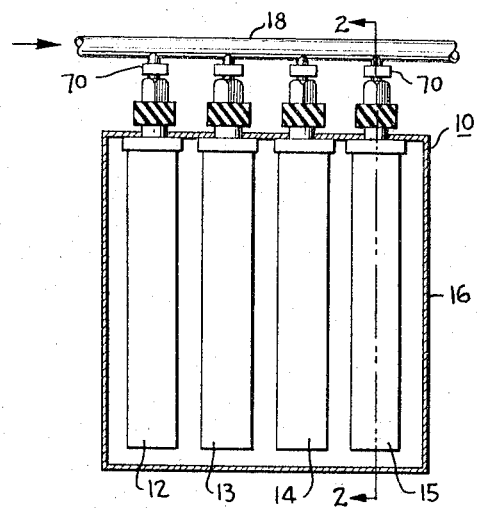
INVENTORS
LAURENCE R. ALEXANDER
EDWARD C. Y. TUNG
BY Watson, Cole, Grindle & Watson
ATTORNEYS

United States Patent Office 3,365,332
Patented Jan. 23, 1968

3,365,332
FUEL CELL CONSTRUCTION
Laurence R. Alexander, North Castle, and Edward C. Y. Tung, Floral Park, N.Y., assignors to Leesona Corporation, Cranston, R.I., a corporation of Massachusetts
Filed Feb. 17, 1961, Ser. No. 90,050
4 Claims. (Cl. 136—86)

This invention relates to fuel cells, and more particularly, to an improved fuel cell construction utilizing dual porosity electrodes.

Priorly, in fuel cell batteries incorporating a number of cells in a single container, serious problems have developed regarding the feeding of gases to the electrodes. It is quite difficult to maintain a close tolerance on the porosity of the electrodes in a battery of cells, and as a result, gas will bubble through certain of the electrodes into the electrolyte at a lower pressure than it will bubble through other electrodes of the battery. For maximum efficiency, the gas pressure should be as high as possible without permitting bubbling of gases through the electrodes. There are a number of disadvantages incident to the bubbling of gas through the electrodes. For example, the bubbling wastes the gases in that electrochemical action does not take place at the three phase interface within the confines of the electrode. The gas passes out into the electrolyte before electrochemical action can take place. The three phase interface is defined as the site at which electrochemical action takes place and consists of a boundary made up of a gas-liquid and solid. To permit this boundary to be set up, a dual porosity sintered structure is preferred. To establish the interface requires that the pressure necessary to push liquid into the coarse pore material be less than the pressure necessary to push the liquid out of the fine pore material by means of the gas. A further disadvantage of bubbling is that the oxidizing gas polarizes the fuel electrode, thus decreasing the efficiency of the cell. Further, bubbling in an electrolyte which is common to all of the cells, disturbs the electrolytic balance for all the cells in the battery.

This problem cannot be effectively obviated in a fuel cell battery by controlling the gas pressure fed to the individual electrodes. The gas pressure in the battery container must necessarily increase if maximum efficiency is to be achieved, and this increased gas pressure above the common electrolyte causes "flooding" of other electrodes in the battery because this pressure is driving the electrolyte into the electrodes beyond the "interface." This flooding of the electrodes further decreases the efficiency of the battery.

Accordingly, it is an object of this invention to provide an improved fuel cell construction.

It is another object of this invention to provide an improved fuel cell construction in which the gas pressures of the electrolyte between the electrodes is automatically adjusted.

It is a still further object of this invention to provide a fuel cell construction which permits maximum efficiency to be developed in a series of cells employing electrodes having differing porosity.

We have discovered that the above-mentioned problems can be obviated by an improved battery construction in which a number of separate cells, which may be connected together in bipolar groups, are fed from common gas feed manifolds and electrical connections can be made to deliver the electrical energy generated by the entire battery. An economical solution of these problems is obtained by the use of an independent electrolyte in a gas enclosure between pairs of electrodes of the cell. This independent electrolyte permits varying pressures in the electrolyte chambers in accordance with the different porosity of the electrodes in the respective cells. Thus, in each instance, the porosity of the electrodes permits a greater or lesser passage of gas from the electrodes into the electrolyte until the pressure differential across the electrode has been reduced to a value sufficient to prevent bubbling in that particular cell. Thus, the individual cell electrolyte pressures are automatically balanced and the problems of bubbling are obviated.

In accordance with the operation of the battery of this system, a battery of group cells having electrolyte sealed between the electrodes of the respective monopolar groups, is assembled and gas pressure equal to the highest bubble pressure of the electrodes assembled is applied to the manifold feeding all of the cells. All of the cells but one will bubble gas through into the electrolyte until the pressure above the electrolyte in each sealed container reaches a point where the differential pressure between the electrolyte and the gas of a particular cell falls below the bubble pressure of the electrodes and bubbling stops. It is, of course, necessary that the electrolyte enclosure between the electrodes is sealed from the ambient during normal operation of the fuel cells. Thus, in this system, each cell operates at its own differential pressure. In this manner, the bubble pressure tolerance of the electrodes need not be retained within narrow ranges and the problem of controlled porosity is not as significant as previously. The manufacture of these electrodes, therefore, becomes much simpler.

These and various other objects and features of the invention will be more clearly understood from a reading of the detailed description of the invention in conjunction with the drawing, in which:

FIGURE 1 is a side view in elevation of a battery of cells in accordance with one illustrative embodiment of this invention;

FIGURE 2 is a view of the embodiment of FIGURE 1 taken along the lines 2—2; and

FIGURE 3 is a side view of FIGURE 2 taken along the lines 3—3 of FIGURE 2.

Referring now to FIGURES 1 and 2, there is depicted a fuel cell battery 10 comprising a group of separately enclosed cells 12, 13, 14, and 15, mounted in a heating tank 16. Each of the separate cells is fed by a pair of gas manifolds, best seen in FIGURE 2, as conduits 18 and 20. A similar pair of exhaust manifolds 22 and 24 are connected to each of the individual cells.

As best seen in FIGURE 3, the individual cell 15 includes a pair of bi-porous electrodes 26 and 28, a gas chamber defining members 30 and 32 secured to electrodes 26 and 28 respectively, and a mechanical support 34 positioned between the electrodes to electrically isolate the electrodes from each other. The chamber between the electrodes 26 and 28 which is designated with the reference numeral 36 is partially filled with liquid electrolyte. A gas space is thereby provided above the electrolyte. The electrodes, of course, are bi-porous to permit the three phase interface to occur within the electrode and thus to provide for maximum efficiency, and the surface having the larger diameter pores is positioned toward the gas feed chambers whereas the surface with the smaller diameter pores is positioned toward the electrolyte chamber 36.

The battery includes communicating gas conduits such as 40 and 42 which supply the respective gases to opposite electrodes at the electrode surface remote from the other electrode of the individual cell from the manifolds 18 and 20, respectively, as best seen in FIGURE 2. Similarly, communicating outlet gas passages 44 and 46 are provided which communicate with manifolds 22 and 24, respectively. Although the electrode assemblies such as 15 are shown to be contained in a circular shaped container 45, this is not a structural limitation. The only limitation on this novel type of construction is that the electrolyte between pairs of electrodes be sealed from the ambient during normal operation of the fuel cell to permit the gas pressure in the electrolyte to be individually balanced against the gas pressure on the opposite side of the respective electrodes. The individual cell tanks or containers such as 45, have an insulating lining of Teflon or other suitable insulating material as depicted at 47 and 49 in FIGURE 3. As best seen in FIGURE 2, the tank 16 is provided with a suitable lining 50 and the individual electrode assemblies such as 12, 13, 14, and 15, are enclosed by means of a cover 52, which may be secured in place by suitable clamping bar 54 and nut and bolt assemblies, such as 56, connected between the container 16 and the clamping bar 54.

A suitable vent port 58 may be provided in the cover 52 and a threaded screw, such as 60, inserted in this vent to permit the release of any pressure which accumulates in the container 16 and to permit the removal of water or water vapor which may be generated as a by-product of the electrochemical action. The space between the communicating conduits, 40, 42, 44, and 46, and the cover 52, may advantageously be sealed by means of a novel sealing assembly shown in detail in FIGURE 2. This sealing assembly includes a sleeve member 60 having a tapered lower portion 62 which snugly engages the cover 54. The upper terminal portion 64 is threaded to receive a cap 66. Advantageously, the passage 65 through the sleeve 60, tapers outwardly in the form of a cone 67 which faces the cap 66. A compressible seal of convenient material such as Teflon, is formed in the shape of a frusto-conical member 69 and is positioned between the cap 66 and the sleeve 60. As the cap is rotated to move the threaded portion 64 downwardly, the sealing member 69 is compressed to fill the space between the conduit 40, the cap 66, and the sleeve 60, thus providing a gas-tight seal around the communicating conduit. An insulating electrical coupling 70 is provided between the cell feed pipes 40, 42, 44, and 46, and the manifold tubes 18, 20, 22, and 24, otherwise all cells will be in parallel and not in series.

While we have shown and described one illustrative embodiment of this invention, it is understood that the principles thereof can be employed in various other embodiments without departing from the spirit and scope of this invention.

What is claimed is:

1. A battery of fuel cells for the direct production of electricity comprising a housing, a plurality of fuel cells in said housing, manifold means for feeding gaseous fuel and oxidant to said cells, said cells including a plurality of spaced pairs of porous electrodes, each pair of spaced electrodes being constructed and arranged to define an enclosure between said electrodes which is sealed from the ambient during normal operation of said fuel cells, said enclosure being partially filled with liquid electrolyte, thereby providing a gas space above the liquid level of said electrolyte, said manifold means constructed for feeding said gaseous fuel and oxidant to each of said electrodes at the electrode surface remote from the other electrode of said pair of spaced electrodes, whereby the gases which pass through said electrodes are retained in said gas space above the electrolyte to establish a pressure above the electrolyte where the differential pressure between the electrolyte and the reactant gases of a particular cell falls below the bubble pressure of the electrodes.

2. A battery of fuel cells as claimed in claim 1 wherein the fuel and oxidant feed means for said electrodes comprises a gas manifold, a communicating manifold connected to said gas manifold and extending through the wall of said housing, a sleeve encircling said communicating manifold and secured to the wall of said housing, a second sleeve threadably engaging said first sleeve and a compressible gasket between said sleeves, said compressible gasket being compressed to fill the region between said communicating manifold and said first sleeve when said second sleeve is rotated relative to said first sleeve.

3. A battery of fuel cells as claimed in claim 2 wherein said first sleeve has a frusto-conical surface therein adjacent said second sleeve, said gasket having a co-operating frusto-conical surface which is positioned adjacent the frusto-conical surface of said first sleeve.

4. A battery of fuel cells as claimed in claim 1 wherein the pairs of electrodes are bi-porous circular dished electrodes.

References Cited

UNITED STATES PATENTS

| 2,947,797 | 8/1960 | Justi et al. | 136—120 |
| 2,969,315 | 1/1961 | Bacon | 136—86 |
| 2,384,463 | 9/1945 | Gunn et al. | 136—86 |

WINSTON A. DOUGLAS, *Primary Examiner.*

JOHN R. SPECK, JOHN H. MACK, *Examiners.*

H. FEELEY, *Assistant Examiner.*